Patented Nov. 11, 1947

2,430,493

UNITED STATES PATENT OFFICE 2,430,493

METHOD OF PREPARATION OF VITAMIN A ETHERS

John D. Cawley, Rochester, N. Y., assignor to Distillation Products, Inc., Rochester, N. Y., a corporation of Delaware No Drawing. Application June 2, 1943, Serial No. 489,381

5 Claims. (Cl. 260—611)

This invention relates to the preparation of new and improved vitamin A products, and in particular to vitamin A ethers and methods of preparing the same.

It has been indicated in an article by Kipping and Wild, "Journal of the Society of Chemical Industry," 17 (1939), 802, that vitamin A methyl ether can be prepared by condensing ionone with a certain bromide in the presence of lithium followed by dehydration. The conditions of reaction, the analysis of the product, its physical, chemical and biological properties are not given. It is indicated that further publication of this subject matter would take place after the vacation. However, up to the present time no further publication on this subject has taken place by these or other authors. This alleged synthesis of vitamin A is of such an important nature that it would have been further described and expoited if it had been found satisfactory. We have carried out similar reactions and have been unable to obtain vitamin A-active substances of any kind. Therefore, it is clear that these authors did not obtain the vitamin A methyl ethers as alleged.

This invention has for its object to provide procedure whereby vitamin A ethers may be readily obtained. A further object is to provide improved procedure for preparing vitamin A-active substances. Other objects will appear hereinafter.

These and other objects are accomplished by my invention which includes heating a vitamin A ester with a primary alcohol.

When preparing the ether by treatment of the vitamin A ester with a primary alcohol it has been noted that the formation of anhydro vitamin A competes with the formation of the vitamin A ether. However, it has been found that lower temperatures favor the formation of the vitamin A ether and I, therefore, prefer to carry the reaction out at temperatures of approximately 60° to 100° C. Higher or lower temperatures can be used. This procedure requires an extended period of heating in order to obtain complete conversion. I prefer to heat for several hours, and it will be found that the conversion is substantially complete in twenty hours, in most cases. However, a certain degree of conversion is obtained even after two hours or somewhat less and such shorter periods of treatment are to be understood as being within the scope of my invention.

Secondary and tertiary alcohols cannot be used in this method since they yield only anhydro vitamin A. However, primary alcohols, as a class, are satisfactory. Examples are methyl, ethyl, primary amyl, octyl and benzyl alcohols. Aliphatic primary alcohols containing 1 to 5 carbon atoms give best results and are preferred. I prefer to use a large excess of alcohol over the stoichiometric amount, but this is merely a matter of convenience and is not essential. The alcohol need not be anhydrous although this is preferred. Any ester of vitamin A can be used in the process. Examples are vitamin A acetate, vitamin A palmitate, vitamin A di-nitro-benzoate, and preferably vitamin A esters in natural form obtained by molecular distillation of fish oils.

Example I 207 grams of a vitamin A ester concentrate prepared from shark liver oil, having $$E(1\%, 1 \text{ cm.}) (328 \text{ mu}) = 297$$

were refluxed with 3.5 liters of methanol for 18 hours, in an atmosphere of nitrogen, in the dark. The methanol was removed by distillation in vacuo in nitrogen, and the residue transferred to a cyclic molecular still. All of the material distilling at 130° and 0.5 micron was collected. This distillate was dissolved in ethyl ether and extracted thoroughly with 10% KOH. The material recovered from the ether by evaporation under nitrogen had the following ultraviolet absorption spectrum:

$$E(1\%, 1 \text{ cm.}) (328 \text{ mu}) = 1110$$
$$E(1\%, 1 \text{ cm.}) (343 \text{ mu}) = 1090$$
$$E(1\%, 1 \text{ cm.}) (367 \text{ mu}) = 1010$$
$$E(1\%, 1 \text{ cm.}) (390 \text{ mu}) = 702$$

This material was subjected to chromatographic absorption on magnesia from petroleum ether solution. The lowest, bright yellow zone contained the anhydro vitamin A, while the vitamin A methyl ether formed a broad, very light yellow zone immediately above this. The latter zone was eluted with ether containing 10–20% methanol, and the material obtained from this eluate in the usual manner further purified by two more absorptions on tricalcium phosphate, from petroleum ether. The vitamin A methyl ether was thus obtained as a pale yellow oil having $$E(1\%, 1 \text{ cm.}) (328 \text{ mu}) = 1550$$

A 20% solution of this material in neutral methyl formate was allowed to stand at −75° C. for two days. The mother liquor was decanted from the gummy material which had deposited and the latter dissolved in sufficient neutral methyl formate to give a 20% solution and let stand at −35° C. Pale yellow crystals were deposited, which, after recrystallization in the same manner, melted at 33–33.5° C.

Anal. calcd. for $C_{20}H_{29}OCH_3$: C,83.94%; H,10.73%; $OCH_3$,10.33%. Found: C,83.98 and 83.86%; H,10.11 and 10.41%; $OCH_3$,10.15 and 10.02%. E(1%, 1 cm.)(328 mu)=1800. The elimination maximum from glyceride constant yield oil is 14° C. below that of celanthrene red 3B. With $SbCl_3$ a blue color identical with that of vitamin A is produced. When bioassayed by the U. S. P. method, the vitamin A potency was found to be 4,800,000 units per gram. It was thus concluded that the substance prepared was vitamin A methyl ether having a potency equal to or greater than pure crystalline vitamin A alcohol.

*Example II*

One hundred and ten grams of a vitamin A natural ester concentrate $[E_{1cm.}^{1\%}(328\ mu)]=480$ and 1.5 liters absolute ethanol were refluxed 22 hours under $N_2$ in the dark. The solvent was removed, the residue distilled in a cyclic batch molecular still and the material distilling at between 140° and 150° C. was separated and this distillate extracted with KOH as described in the preparation of the methyl ether (Example I). The product had the following optical properties:

$$E(328\ mu)=1120;$$
$$E(350\ mu)=1230;$$
$$E(369\ mu)=1290;$$
$$E(389\ mu)=1010.$$

This was chromatographed from "Skellysolve F" (petroleum ether) on a mixture of powdered "Hydralo" and celite (75:25). The lowermost bright yellow band of anhydro vitamin A was washed through with "Skellysolve F" and then the next light yellow zone of the ether washed through with 1:4 benzene-"Skellysolve F." The material obtained from this was rechromatographed twice more in exactly the same way, to give the vitamin A ethyl ether as a pale yellow oil, E(325 mu)=1530. This resisted all attempts at crystallization. The product gave with $SbCl_3$ a blue color indistinguishable from that given by vitamin A. Upon analytical molecular distillation it was found that the elimination maximum was 5° C. above that of the vitamin A methyl ether which corresponds to the theoretical increase due to the additional $CH_2$ group.

*Example III*

A solution of sodium naphthalene was prepared from 7.68 g. naphthalene, 1.15 g. sodium, and 60 g. ethylene glycol dimethyl ether. To this solution, cooled in ice, was added 14.3 g. of vitamin A alcohol in 25 ml. of the glycol ether. The mixture was stirred 5 minutes, and then 8.5 g. of methyl iodide were added slowly. The mixture was stirred in the ice bath for 10 min. then heated gradually to refluxing and refluxed 1 hour, under nitrogen. The light yellow mixture was let stand overnight, then diluted with ethyl ether and washed thoroughly with water. The vitamin A methyl ether thus prepared was purified by chromatographic absorption in the manner described in Example I, and had the same properties as the material described therein.

The vitamin A ethers have high biological activity, the same as, or perhaps somewhat higher than, that of vitamin A esters. They have other desirable and advantageous properties such as high stability.

All spectrographic absorptions described were determined with ultraviolet light and the test material was dissolved in alcohol in all cases.

What I claim is:

1. The process of preparing vitamin A ethers which comprises in combination heating a vitamin A ester in the presence of a primary alcohol for several hours at a temperature of between about 60° to 100° C., whereby the alcohol and vitamin A ester react to form the corresponding vitamin A ether and the acid portion of the vitamin A ester molecule is eliminated as free acid.

2. The process of preparing vitamin A ethers which comprises in combination heating a vitamin A ester in natural form in the presence of a primary alcohol for several hours at a temperature in excess of about 60° C., whereby the alcohol and vitamin A ester react to form the corresponding vitamin A ether and the acid portion of the vitamin A ester molecule is eliminated as free fatty acid.

3. The process of preparing vitamin A ethers which comprises in combination heating a vitamin A ester in the presence of a primary aliphatic alcohol for a period of time substantially in excess of one hour whereby the vitamin A ester and the alcohol react to form the corresponding vitamin A ether and the acid portion of the vitamin A ester molecule is eliminated as free acid.

4. The process of preparing vitamin A ethers which comprises heating a vitamin A ester in natural form in the presence of an excess of a primary aliphatic alcohol containing one to five carbon atoms to a temperature of between about 60° to 100° C., for a period substantially in excess of one hour whereby the alcohol and vitamin A ester react to form the corresponding vitamin A ether and the acid portion of the vitamin A ester molecule is eliminated as free fatty acid.

5. The process of preparing vitamin A methyl ether which comprises heating a vitamin A ester in natural form with an excess of methanol and in the presence of nitrogen for a period of eighteen hours at refluxing temperature removing the methanol by distillation in vacuo under nitrogen subjecting the residue to distillation under molecular distillation conditions separating a fraction distilling at about 130° C. and separating crystalline vitamin A methyl ether from this fraction.

JOHN D. CAWLEY.

REFERENCES CITED

The following references are of record in the file of this patent:

UNITED STATES PATENTS

| Number | Name | Date |
| --- | --- | --- |
| 2,249,525 | Hickman | July 15, 1939 |
| 2,233,375 | Kuhn | Feb. 25, 1941 |

OTHER REFERENCES

Kipping, "Chem. & Ind.," vol. 17, p. 802 (1939).
Piccinini, "Boll. Chim. farm.," 77 pp., 369–373 (1938).
Chemical Abstracts, vol. 31 (1937), columns 4653–4654.